Aug. 6, 1929.  M. EHRICKE  1,723,686

VEHICLE OPERATED LIFT

Filed Dec. 9, 1926

Inventor:
Max Ehricke
by
Atty.

Patented Aug. 6, 1929.

1,723,686

UNITED STATES PATENT OFFICE.

MAX EHRICKE, OF LEIPSIC-PLAGWITZ, GERMANY, ASSIGNOR TO THE FIRM: RUDOLF SACK, OF LEIPSIC-PLAGWITZ, GERMANY.

VEHICLE-OPERATED LIFT.

Application filed December 9, 1926, Serial No. 153,684, and in Germany August 18, 1926.

My invention relates to tractors and more especially to means for supporting on a tractor an agricultural implement, a cultivator, a plough or the like, so as to move the implement into operative position by lowering it and to render it inactive by elevating it.

It has already been proposed to elevate implements of the kind described through the medium of the tractive effort exerted by a tractor and my invention relates to means operating on the same principle but it is an object of my invention to replace the mechanisms which have already been proposed for this object by a mechanism which is more simple than the aforesaid mechanisms and at the same time performs all the functions required.

To this end I provide a part which may be a double-armed lever fulcrumed on the frame of the tractor, and connect one arm to the lever with the implement while the other arm is provided with a rack fulcrumed thereon. This rack is adapted to temporarily engage a gear wheel on the driving wheel whereupon the implement is elevated by the tractive effort. A pawl is provided for locking the arm in the position in which the implement is elevated, and means are connected with the rack for controlling the pawl so as to throw it out of its locking position.

In the drawings affixed to this specification and forming part thereof a device embodying my invention is illustrated diagrammatically by way of example.

In the drawings

Figure 1:
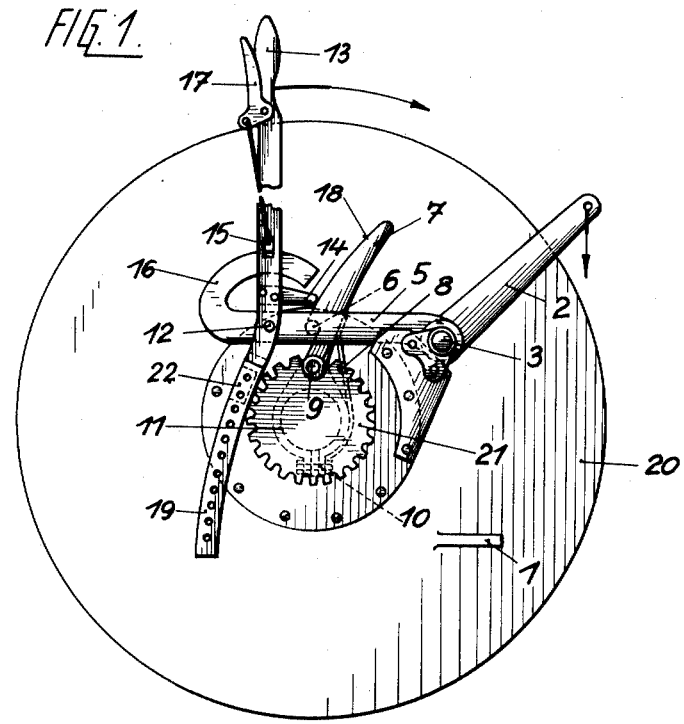
Fig. 1 is a cross-section.
Figure 2:
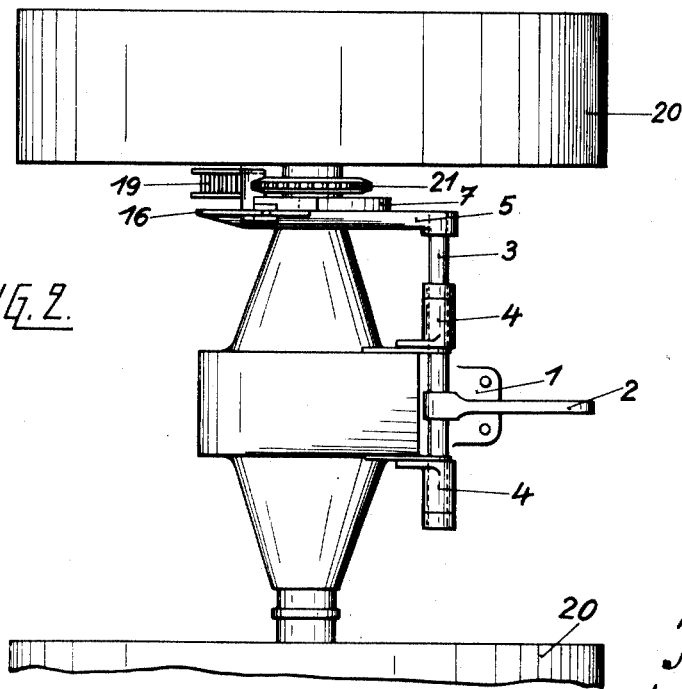
Fig. 2 is a plan view of the driving axle and wheel of the tractor, the parts being shown in the position in which the plough or other implement is lifted free of the ground.

Referring to the drawings, 1 is a drawbar which is attached to the frame of the tractor by any suitable means, not shown. The only part of the tractor frame which has been illustrated, is the axle tube for the driving wheels 20, 20'. Supported on the tube in bearings 4, 4 is the shaft 3 of a double-armed lever 2, 5. The implement, not shown, is suspended from the arm 2 as indicated by the arrow in Fig. 1. The other arm 5 is provided with a pin 6 adapted to be engaged by a pawl 7. This pawl is fulcrumed at 9 on a bracket 11 which is held on the axle tube by a screw 10. 8 is a spring tending to hold the pawl 7 engaged with a pin 6. 12 is a pivot on the arm 5 on which a handle 13 is adapted to rock. The handle at its lower end is provided with a rack 19 adapted to temporarily engage a gear wheel 21 on one of the driving wheels 20. 22 is a block on the rack which when engaged by the teeth of the gear wheel 21, throws the rack out of mesh with the wheel. 16 is a sector formed on the arm 5, 15 is a catch adapted to engage a notch in the sector and 17 is a lever for operating the catch 15. 14 is a dog on the handle 13 which is adapted to engage a curved race 18 on the pawl 7.

In the position illustrated in Fig. 1, the implement has been elevated and the arm 5 has been locked by the pawl 7. When it is desired to lower the implement, the handle 13 is rotated in the direction of the arrow, Fig. 1. This causes the dog 14 to engage the race 18 on the pawl 7 so that the pawl releases the pin 16. The weight of the implement acting in the direction of the arrow at the end of the arm 2 pulls down the arm so that the implement moves into operative position by gravity. The pin 6 slides on the race 18 of the pawl 7 against the action of the spring 8.

When it is desired to elevate the implement, the handle 13 is moved in opposite direction to the arrow in Fig. 1, so that the rack 19 is engaged by the gear wheel 21. This causes the arm 5 to be pulled down while the arm 2 is elevated. When the arm 5 has returned into the position illustrated, it is locked by the pin 6 which has now slid off the race 18. The dog 14 does not interfere as it is out of reach of the race 18 as long as the gear wheel is meshing with the rack 19. When the arm 5 has been locked by the pawl 7, the block 22 is engaged by the teeth of the gear wheel 21, throwing the rack 19 out of mesh with the teeth so that the rack 19 no longer exerts a downward pull on the lever 5.

I wish it to be understood that I do not desire to be limited to the exact details of construction shown and described for obvious modifications will occur to a person skilled in the art.

I claim:—

1. A tractor comprising a frame, a driving wheel on said frame, a part fulcrumed on said frame and adapted to displace an agricultural implement with respect to said frame, a gear wheel on said driving wheel, a rack fulcrumed on said part and adapted to temporarily engage said gear wheel for moving said part so as to elevate said implement, a pawl for locking said part in the position in which the implement is elevated, and means operatively connected with said rack for controlling said pawl.

2. A tractor comprising a frame, a driving wheel on said frame, a double-armed lever fulcrumed on said frame, one arm of said lever being adapted to support an agricultural implement, a rack fulcrumed on the other arm of said lever, a gear wheel operatively connected with said driving wheel and adapted to be temporarily engaged by said rack, a pin on said double-armed lever, and a pawl fulcrumed on said frame and adapted to engage said pin so as to hold the implement-supporting arm of said lever in elevated position.

3. A tractor comprising a frame, a driving wheel on said frame, a double-armed lever fulcrumed on said frame, one arm of said lever being adapted to support an agricultural implement, a rack fulcrumed on the other arm of said lever, a gear wheel operatively connected with said driving wheel and adapted to be temporarily engaged by said rack, a pin on said double-armed lever, a pawl fulcrumed on said frame and adapted to engage said pin so as to hold the implement-supporting arm of said lever in elevated position, and means on said rack for disengaging said pawl from said pin.

4. A tractor comprising a frame, a driving wheel on said frame, a double-armed lever fulcrumed on said frame, one arm of said lever being adapted to support an agricultural implement, a rack fulcrumed on the other arm of said lever, a gear wheel operatively connected with said driving wheel and adapted to be temporarily engaged by said rack, a handle connected with said rack, means for securing said handle in a definite position with respect to said arm on which it is pivoted, a pin on said double-armed lever, a pawl fulcrumed on said frame and adapted to engage said pin so as to hold the implement-supporting arm of said lever in elevated position, and a dog on said handle adapted to disengage said pawl from said pin.

In testimony whereof I affix my signature.

MAX EHRICKE.